United States Patent [19]

Bliss et al.

[11] 4,316,179

[45] Feb. 16, 1982

[54] FIRE DETECTION SYSTEM

[76] Inventors: Timothy R. Bliss, P.O. Box 466, Darien, Wis. 53114; Richard T. Canepa, 837 Victoria Pl., Janesville, Wis. 53545

[21] Appl. No.: 158,465

[22] Filed: Jun. 11, 1980

[51] Int. Cl.³ .......................... G08B 1/08; H04Q 1/30; G08B 17/06

[52] U.S. Cl. .................................... 340/538; 340/589; 340/596; 340/310 A

[58] Field of Search .................... 340/589, 310 R, 596, 340/566, 538

[56] References Cited

U.S. PATENT DOCUMENTS

| | | | |
|---|---|---|---|
| 2,832,915 | 4/1958 | McCoy | 340/566 X |
| 3,255,441 | 6/1966 | Goodwin et al. | 340/589 X |
| 3,701,985 | 10/1972 | Davies | 340/596 X |
| 4,058,678 | 11/1977 | Dunn et al. | 340/310 A X |

*Primary Examiner*—John W. Caldwell, Sr.
*Assistant Examiner*—Daniel Myer
*Attorney, Agent, or Firm*—Andrus, Sceales, Starke & Sawall

[57] ABSTRACT

A system for detecting fires in a barn or similar structure includes rate of rise heat detectors and temperature sensing cable. Upon detection of a predetermined rate of rise or a predetermined temperature the control circuitry of the system produces an output signal that activates an audible alarm mounted outside the barn. The control circuitry also produces an FM signal that travels through the power lines servicing the farm. The FM signal activates an audible alarm plugged into an electrical outlet in the home.

1 Claim, 4 Drawing Figures

FIRE DETECTION SYSTEM

BACKGROUND OF THE INVENTION

This invention relates to fire detection systems and more specifically to fire detection systems for use in barns or similar structures.

Agricultural fire protection presents unique problems due to the harsh environment in which a fire detection system must operate. Photo-electric and ionization smoke detectors have proven to be superior devices for use in home and industry, but have proven to be very unreliable in a barn environment.

Even the most advanced smoke detectors produce numerous unwanted alarms. In order for the smoke detectors to perform with any degree of reliability, it is necessary to clean and maintain them on a regular monthly basis. Due to the air currents, dust, insects, etc., smoke detectors are not suitable for barn environment use.

Also, since the majority of agricultural fires occur in the evening hours, it is desirable that any detection system provide an alarm to the residents of the house. Prior systems utilized alarms contained within the detector resulting in a rather limited alarm area.

SUMMARY OF THE INVENTION

A fire detection system for use in a barn or other similar structure includes a number of rate of rise heat detectors in combination with a length of temperature sensing cable.

Upon detection of a predetermined rate of rise or a predetermined temperature the control circuitry of the system produces an output signal that activates an audible alarm mounted outside the barn.

The control circuitry also produces an FM signal that travels through the power lines servicing the farm. The FM signal activates an audible alarm plugged into an electrical outlet in the home.

The present invention thus provides a fire detection system that is immune to the dust, air currents and insects of a barn environment; thus resulting in a reliable detection system that does not require regular cleaning and maintenance.

The present invention also provides a system that produces an audible alarm not only in the barnyard, but also in any desired room in the farm residence.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
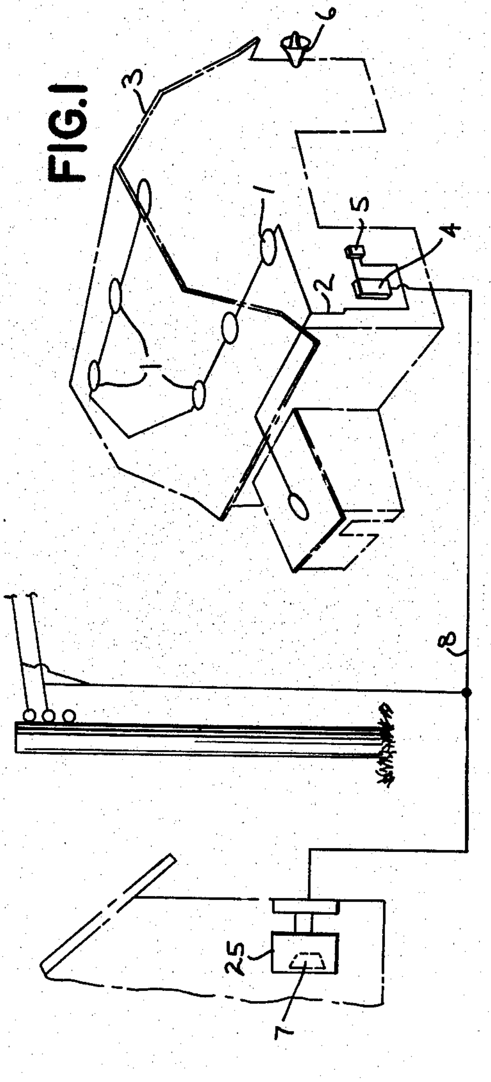
FIG. 1 is a perspective view illustrating a barn utilizing the fire detection system and illustrating the power lines servicing the farm structures.

As is shown in FIG. 1 the fire detection system consists of rate of rise heat detectors 1 and temperature sensing cable 2 placed in the ceiling area of barn 3 and around circuit box 4.

The detection system also includes control box 5 which produces signals to activate siren 6 and remote alarm 7 located in the farm residence.

Remote alarm 7 is plugged into any electrical outlet and is activated by an FM signal that is produced by control box 5 and transmitted to alarm 7 via power lines 8 that service the house and the barn.

Rate of rise detectors 1 are UL listed commercially available devices that combines rate of rise and fixed temperature features. Upon detection of a predetermined rate of rise or a predetermined temperature detectors 1 close a normally open circuit.

Figure 2:
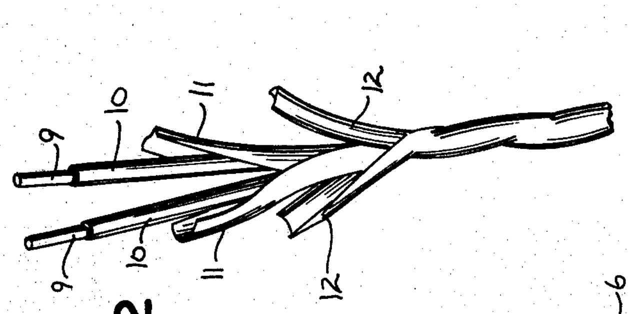
FIG. 2 is a perspective view of the temperature sensing cable with layers stripped away.

Detection cable 2 as shown in FIG. 2 is a special line-type detector comprised of two actuators 9 of high tensile spring steel wire, individually encased in a thermoplastic or heat sensitive material 10. The encased actuators 9 are twisted together to impose a spring pressure on the thermoplastic material between them, then spirally wrapped with a protective tape 11 and provided with an outer covering 12 to tolerate the harsh agricultural environment.

At the critical or operating temperature (190 F.), the thermoplastic 10 yields to the pressure on it, permitting the actuators 9 to move into contact with each other. This action takes place at the first heated point anywhere along detection cable 2. It does not require any specified length to be heated. The heat does not have to result from open flame, nor produce any specified density of smoke, nor increase at any particular rate. Heat alone causes the alarm.

Figure 3:
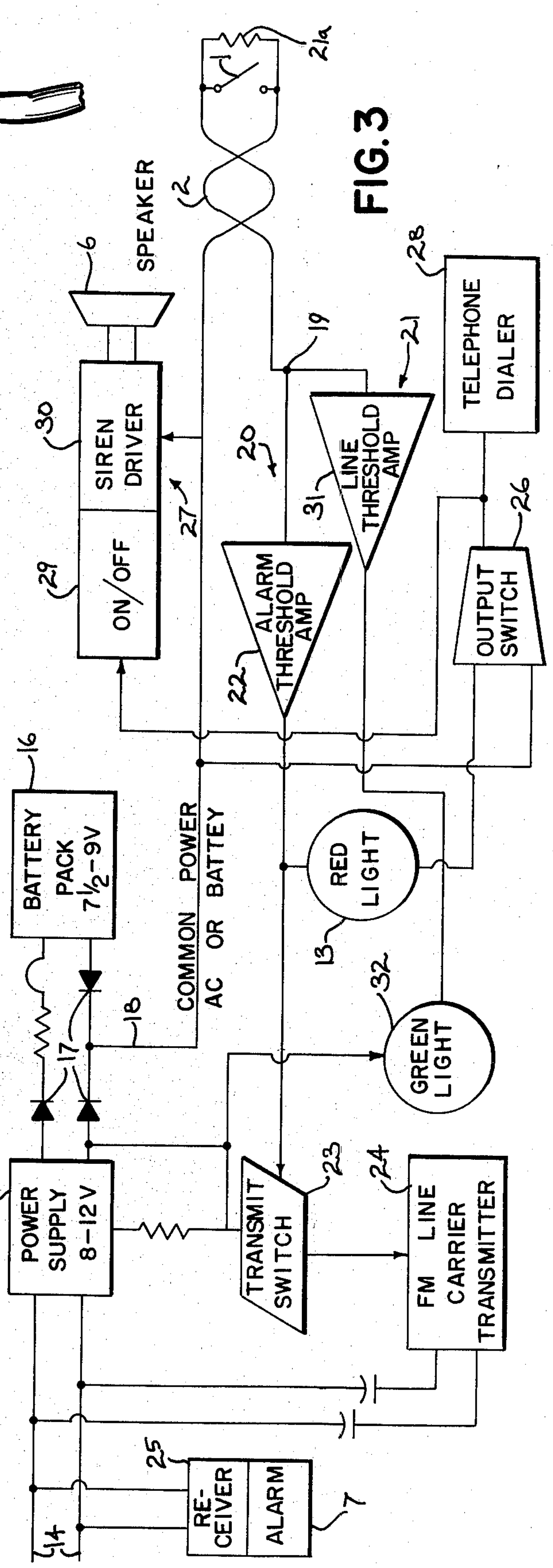
FIG. 3 is a block diagram of the fire detection control system circuitry.

Referring to FIG. 3 a control circuit for the described alarm system is illustrated in block diagram interconnected to the detectors 1-2 and providing for suitable alarm, such as the local lamp 13, sound generator 6, and a remote sound generator 7. The illustrated system is adapted to be driven directly from the conventional 120 volt alternating current (AC) power system conventionally employed in the United States and readily available in homes, farms, institutions and the like. The power lines 14 are coupled to drive a DC (direct current) power supply 15 adapted to produce a low voltage DC output, such as an 8 to 12 volt supply conventionally employed in DC control systems. In the illustrated embodiment of the invention, the power supply 15 is coupled to continuously charge a standby battery pack 16, the output of which is operable upon failure of the AC supply power to power the system. It thus provides an alternate supply to maintain operation during AC power failure. A suitable diode network 17 is provided for appropriate charging of the battery pack 16 and simultaneously providing coupling to a common power output line 18 for driving of the system. The DC power supply 15 connection to the alarm system is in series with and includes special condition sensitive lines 2 with a plurality of parallel condition sensitive detectors 1 connected across lines 2. The lines 2 connect the opposite sides of each detector 1 in series with the DC power line 18 and the input 19 of the alarm circuitry which, in the illustrated embodiment of the invention, includes an alarm threshold branch 20 and a line threshold branch 21. Detectors 1 are suitable normally open switch means which close in response to a selected heat level to transmit the DC voltage to the alarm branch. The alarm branch lines 2 are terminated in a high resistance shunt 21*a* to establish a normally low current path through the branch, as hereinafter described. The alarm threshold branch 20 includes a suitable amplifier means 22 for detecting an alarm condition at the detectors 1–2. The output of the alarm threshold amplifier 22 is coupled to enable a transmit switch 23 for powering a signal transmitter 24. When actuated, transmitter switch 23 supplies power to the transmitter 24 which transmits a unique frequency signal. The transmitter 24 is connected directly to the power lines 14 and establishes an appropriate output signal on the 120 volt AC power distribution system line 14. The same system is coupled and drives the house wiring and thus transmits the corresponding signal to an FM receiver 25, forming a part of the house mounted alarm 7.

The output of the alarm threshold branch 20 is also connected to one side of the local alarm lamp 13 identified as a red light. The opposite side of the lamp 13 is connected in series circuit with an output switch 26 back to DC power line 18. When an alarm condition occurs, power is supplied to the lamp 13 and to the output switch 26 to simultaneously illuminate the lamp and turn-on the output switch 26. The output switch 26 in turn establishes an output to an audible driving circuit 27 for the audible alarm 6, and to a telephone dialer 28 in the illustrated embodiment of the invention. The telephone dialer 28 may be a conventional dialing unit adapted to dial automatically some central or control station. The audible driving circuit 27 is shown consisting of an on-off switch circuit 29 coupled to control a speaker driving circuit 30. The on-off circuit 29 establishes a timed modulated signal to the drive circuit 30 to provide a conventional modulated audible output from the speaker 6.

The line threshold branch 21 also includes a switching amplifier 31 coupled to the input terminal 19 and is operable to normally complete the circuit to one side of the line signal unit shown as green lamp 32, the opposite side of which is connected to a power supply 15. Under normal conditions, the green lamp will be on. In the event of a loss of AC and DC power, the green light turns off to signal such loss of the power. In the event of AC power only, the green lamp 32 is on but dim because it is only driven by the leakage current of the diode network 17. This does indicate operation on battery power and that the AC power system is therefore not properly functioning.

Figure 4:
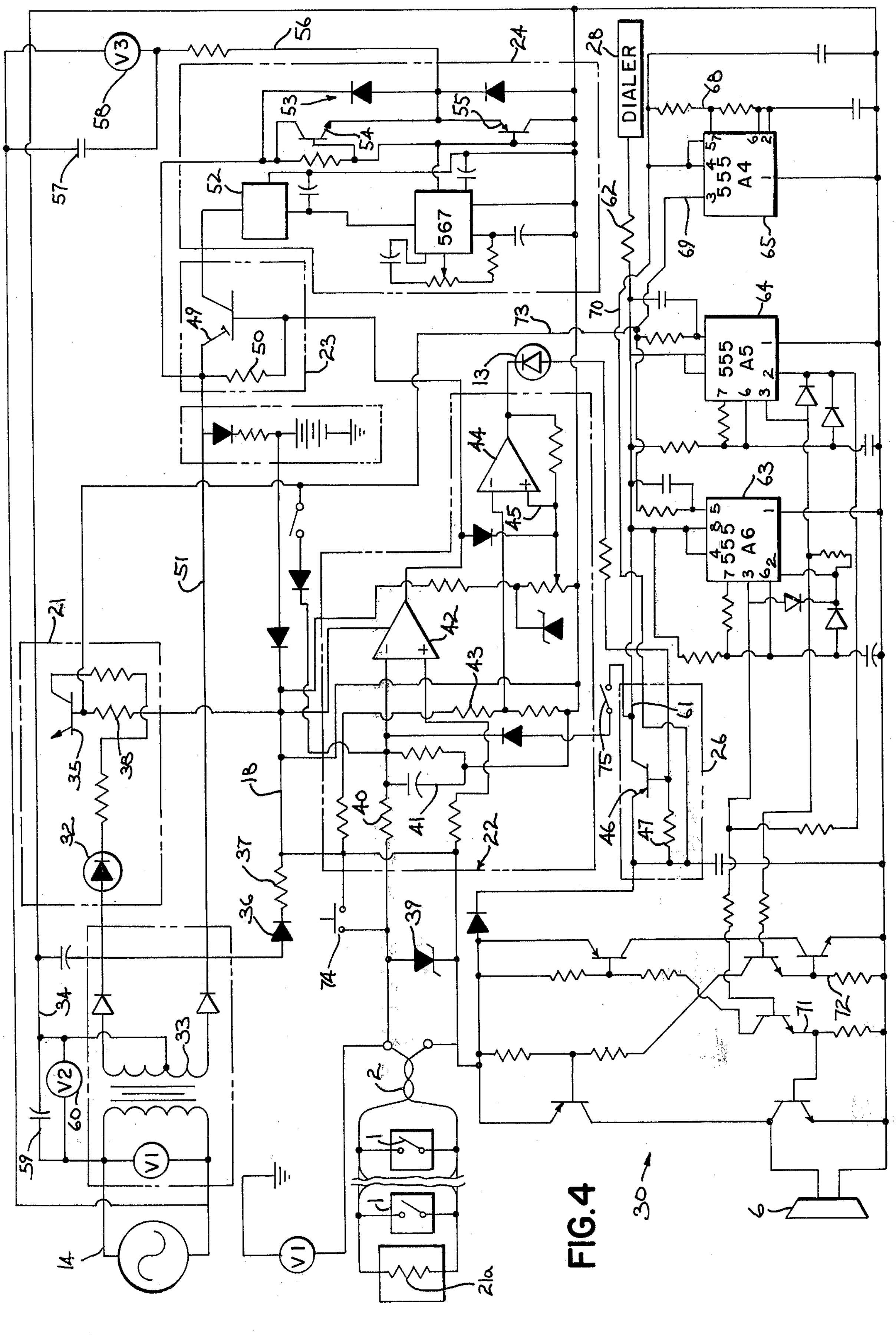
FIG. 4 is a schematic diagram of the control circuitry.

Although the several components may of course be constructed in accordance with any suitable design, a satisfactory and practical circuit is schematically shown in FIG. 4.

The several components and circuit connections are generally basically well known circuit system designs which will be readily understood by those skilled in the art and consequently detailed description thereof and the values thereof are not set forth. Such information will be readily available to those skilled in the art and will vary widely depending upon the specific components and approach undertaken by the designer and any such information given would unduly complicate and confuse the description and is not therefore given herein.

Referring particularly to the more detailed illustrated embodiment of the invention, the power supply 15 is shown as a conventional transformer-rectifier assembly having a center tapered secondary 33 providing the common ground connection 34.

The supply is connected to directly power the green operating lamp 32 in series with a transistor 35 forming the line threshold amplifier 31. The one side of power supply 15 is connected in series with a diode 36 and limiting resistor 37 to DC line 18. The base junction of transistor 35 in series with a resistor 38 is connected to the DC line 18 and to ground line 34 which normally biases the transistor to conduct. With the transistor driven on, power is simultaneously supplied and flows through the green lamp 32, turning on the lamp to indicate normal power line operation. If the lamp is off, there is an indication that both the AC and DC power has been lost, and if burning dimly, that the AC power is lost and the system is being battery operated.

The power supply, and particularly line 18, is connected directly to one of the detector leads 2, with the detectors 1 connected between that lead and the return lead 2. A voltage limiting avalanch diode 39 is shown connected across the detector circuit to limit the voltage thereacross. A signal lead 40 connects the one signal lead 2 to the input of the alarm threshold amplifier 22 in series with a stabilizing network 41. The threshold amplifier 22 in the illustrated embodiment of the invention is shown including a first level detect operational amplifier 42. The one side of the operational amplifier 42 is connected to the power line 18 through a voltage dividing reference branch 43 to establish a reference level signal. The opposite side of the amplifier 42 is connected to the output side of the detection circuit by signal lead 40 and thus to the power supply 15 in series with the signal leads 2, and the detectors 1 or terminating shunt **21*a***.

The output of the level detect amplifier 42 is connected to a driver operational amplifier 44 for driving of the alarm lamp 13 and directly to the transmit switch 23 for turning on of the FM transmitter. Amplifier 44 includes a reference voltage branch 45, which holds the amplifier off. The level detect and drive amplifiers 42 and 44 are a conventional operational amplifier which are connected to produce a switched output dependent upon the relative level of the reference and detection signals. The output of the driver amplifier 44 is connected to the one side of the red alarm lamp 13. The opposite side of the red lamp 13 is connected in series with the output switch 26 directly to the DC power line 18.

The output switch 26 is a transistorized switch unit having a transistor 46 with its emitter-to-base junction connected in series with a current limiting resistor to the one side of the red lamp 13. A bias resistor 47 is connected in parallel with the emitter-to-base injunction and thus in series with the current limiting resistor to the red lamp. When the drive amplifier 44 turns on, power is supplied from the DC line 18 through the input circuit resistor 47 of the output switch 26 to the red lamp 13 and the turned-on amplifier 44. Thus, when an alarm condition occurs, the threshold amplifier 42 switches to an alarm condition driving on the amplifier 44 and turning on of the lamp 13.

Simultaneously, the output of the level detect amplifier 42 transmits a signal to the transmit switch 23. The transmit switch 23 is also shown as a transistor 49 having its input circuit 50 connected to the output of the power supply 15 via a line 51 and level detect amplifier 42 of alarm threshold amplifier 22. The output circuit of the transistor 49 is connected to the input of the FM transmitter 24 and when the transistor 49 is driven on, input power drives the FM transmitter 24 on. The FM transmitter 24 is illustrated using a conventional integrated circuit 52, such as an A567 unit with the appropriate circuit connections as illustrated to provide a signal which is transmitted to the power lines 14. In the illustrated embodiment of the invention, transmitter 24 includes a transistorized output circuit 53 consisting of a pair of transistors 54 and 55 having a common output connection to a signal transmitting line 56, which is connected by a coupling capacitor 57 in parallel with a voltage suppresser 58 directly to the one side of AC lines 14. The opposite side of the AC lines 14 is connected as the common of the system and also includes a similar coupling capacitor 59 and voltage suppresser 60. Thus in the presence of an alarm condition, the red lamp 13 is illuminated and the FM transmitter 24 is actuated to transmit a signal over the power lines 14 to the remote location receiver 25 operating alarm 7.

In addition, the output switch 26 is turned on and provides an output signal to the speaker system and simultaneously to the telephone dialer 28, as follows.

Thus, as previously noted, the input circuit 42 of switch 26 is connected in series with lamp 13 and conducts when the amplifier 44 turns on.

The output of the output switch 26 is connected via an output line 61 to the dialer 28 and to the signal modulating or on-off circuit 29 for driving the speaker driver circuit 30. The line 61 is connected to dialer 28 in series with a coupling resistor 62 for operation thereof in response to an alarm completion.

The modulating circuit is shown as a three-stage unit including a pair of similar audio timing circuits 63 and 64 and a modulating circuit 65. A pair of known integrated 555 circuits are shown defining the audio output frequency signal. The stages 63 and 64 are connected to the output of switch transistor 46 and turned on thereby to generate alternate driving signals to the driver circuit 30 at an audio frequency. This audio frequency signal is further modulated by the third stage 65 to produce a modulated audio signal to the driving stage 30 which in turn correspondingly drives the speaker 6. The modulating circuit 65 is a similar integrated circuit with its timing network 68 set to create a slow running oscillator, such as one cycle per second. The output lead 69 is connected to modulate the amplitude output of stages 63 and 64. The third stage unit 65 includes a power supply line 70 which is connected to supply line 18 to the input side of and in common with transistor 46 of switch 26. The third stage unit 65 thus modulates the audio frequency signal at one cycle per second which varies the amplitude of the audio sections 63-64. The output of the audio systems 63-64 is coupled to the driver circuit 30 to correspondingly operate the speaker 6.

The driver circuit 30 is shown as a transistorized circuit having a pair of parallel branches 71 and 72 coupled to the opposite sides of the speaker 6 and operable to drive the speaker with a varying or modulated sound output.

The detail connection of the on-off circuit 29 and the driver circuit 30 will be readily understood by those skilled in the art and no further description is given herein.

The modulating stage 65 is also connected to provide an additional signalling if the detection circuit of detectors 1-2 is partially or wholly opened. Thus, if for any reason the leads 2 or the terminating resistor 21*a* should become disconnected or the terminal connection become loose, the input current to the timing unit 63 increases and operates the third stage 65. The output of the third stage 65 is connected via a lead 73 directly to the base input of the green light driving transistor 35. When the third stage unit 65 is driven on, the output periodically drives the base of transistor 35 to the reference, thereby backbiasing the transistor during the timing period. The lamp 32 is thus turned off at the cycle or sweep rate of stage 65, with a corresponding blinking of the green lamp 32. The blinking provides a visual signal indicating that the detection system is not properly connected.

An emergency switch 74 is shown connecting the power supply line 18 directly into the circuit system to by-pass the detectors and drive the signal alarm system. Switch 74 is connected directly across the detection circuit leads 2 and closing the switch thus simulates closing of a detector 1.

A latch switch 74 is also illustrated including a circuit connection to by-pass the detection circuit for turning on the alarm system. Thus, with the switch 75 in the closed position, once the switch 46 turns on, power is applied to the signal input of amplifier 42 and locks the system turned on, even though a fault resets.

In summary, the detector leads 2, detector units 1 and termination resistor 21*a* are connected to control the transmission of power to the alarm threshold amplifier 22 and line threshold amplifier. When an alarm condition occurs, the amplifiers 42 and 44 turn on to actuate the transmit switch 23, and the output switch 26 to simultaneously actuate on site visual and audio alarms 13 and 6 as well as the remote alarm 7. If latch switch 75 is closed, the alarm remains on even though the alarm condition is corrected until such switch is opened. In the event of a power line failure, the battery supply establishes and maintains system operation, with a distinct dimming of the green lamp 32 to warn the user of such failure. If all power is lost, lamp 32 is off. If the lines 2 or terminal resistor 21*a* is improperly connected, the output of the modulating stage 65 actuates the green lamp 32 to provide a visual blinking indication of such fault in the detection system.

The system thus provides continuous monitoring of the system operation as well as detection of fire in the barn or other area.

Various modes of carrying out the invention are contemplated as being within the scope of the following claims, particularly pointing out and distinctly claiming the subject matter which is regarded as the invention.

We claim:

1. A fire detection system for use in a barn or like enclosure having electrical appliances and an electrical service panel providing electrical power to the structure, said system comprising:
   a. means for sensing rate of rise of heat in the barn;
   b. heat detecting cable for sensing a predetermined temperature in the barn said cable being located in the vicinity of the electrical service panel and the electrical appliances;
   c. control means operably connected to said rate of rise sensor and said heat detecting cable whereby upon detection of a predetermined rate of rise or a predetermined temperature said control means produces an output signal;
   d. a first audible warning device for mounting outside of the barn, said first warning device operable by said output signal produced by said control means;
   e. a second warning device for mounting in a structure remote from the barn; said second warning device comprising a FM signal receiving unit adapted for plugging into an electrical outlet of the electrical power lines servicing the structure and the barn whereby said second warning device may be moved to any room having an electrical outlet in said structure said second warning device operable by an FM signal produced by said control circuitry and transmitted to the power lines.

* * * * *